United States Patent [19]

Plumer

[11] Patent Number: 5,542,753
[45] Date of Patent: Aug. 6, 1996

[54] WHEEL OPENING INSERTS AND LUG NUT ASSEMBLIES THEREOF FOR MOUNTING NON-FERROUS VEHICLE WHEELS

[76] Inventor: Mark J. Plumer, 980 Amalfi Dr., Pacific Palisades, Calif. 90272

[21] Appl. No.: 187,203

[22] Filed: Jan. 27, 1994

[51] Int. Cl.⁶ ..................................................... B60B 3/16
[52] U.S. Cl. ......................... 301/65; 301/35.62; 411/368; 411/544; 411/917
[58] Field of Search ............................... 301/65, 64.7, 6.1, 301/6.91, 35.62; 411/368, 369, 370, 542, 544, 917

[56] References Cited

U.S. PATENT DOCUMENTS

| | | | |
|---|---|---|---|
| 2,844,409 | 7/1958 | Eksergian | 301/35.62 X |
| 3,556,570 | 1/1971 | Cosenza | 411/544 X |
| 3,659,901 | 5/1972 | Porsche et al. | 301/65 |
| 3,746,399 | 7/1973 | Verdier | 301/65 |
| 3,788,185 | 1/1974 | Gutshall | 411/369 X |
| 4,898,429 | 2/1990 | Plumer | 301/65 X |
| 4,973,102 | 11/1990 | Bien | 411/368 X |
| 5,033,801 | 7/1991 | Beely | 305/54 |
| 5,069,589 | 12/1991 | Lemke | 411/368 X |

FOREIGN PATENT DOCUMENTS 0163801  7/1987  Japan ........................ 301/65

*Primary Examiner*—Russell D. Stormer
*Attorney, Agent, or Firm*—Robert J. Schaap

[57] ABSTRACT

Vehicle wheel nut inserts adapted to extend into the stud-receiving openings of a vehicle wheel and particularly, a non-ferrous vehicle wheel and lug nut assemblies thereof. The inserts are uniquely designed so that the inserts can be permanently locked in the stud-receiving openings of the vehicle wheel. In one embodiment, the wheel inserts can be locked by means of an interference fit, and in another mode, the inserts can be locked by swaging and still further, the inserts may be locked by means of staking the inserts in the stud-receiving openings. Not only are the inserts permanently affixed within the stud-receiving openings, they will also operate to bear against the lug nuts. In this way, a spring-type loading is imposed on the lug nut preventing an unauthorized vibrational unwinding of the lug nut. The insert will deflect when tightened against the wheel opening by a lug nut to thereby provide a Belleville spring effect.

40 Claims, 5 Drawing Sheets

WHEEL OPENING INSERTS AND LUG NUT ASSEMBLIES THEREOF FOR MOUNTING NON-FERROUS VEHICLE WHEELS

BACKGROUND OF THE INVENTION

1. Field of the Invention

This invention relates in general to certain new and useful improvements in vehicle wheel inserts and lug nut assemblies thereof, and more particularly, to such vehicle wheel inserts which are in cooperative relationship with lug nuts in non-ferrous wheels for ensuring a precise and accurate tightening of the wheel against the vehicle hub without any damage to the vehicle wheel and which precludes unauthorized vibrational unwinding of the lug nuts.

2. Brief Description of the Prior Art

In recent years, automobile manufacturers have resorted to the production of non-ferrous wheels for motor vehicles and particularly, wheels made of aluminum and magnesium. In addition, wheels which are made of non-ferrous materials are frequently offered in the automotive aftermarket or so-called "secondary market" for purposes of customizing a vehicle. As a result of their light weight and attractive appearance, non-ferrous wheels have thereby become popularized. Accordingly, many automotive enthusiasts will therefore substitute these non-ferrous wheels for the conventionally provided steel vehicle wheel.

One of the major problems with the use of non-ferrous wheels, such as aluminum wheels, is the fact that the lug nuts have a tendency to become loose from vibrational effects and as a result of wear resulting from the steel lug nut rubbing against the softer aluminum seat during wheel rotation. The flexing of a wheel mounting stud normally occurs due to vibrations resulting from road conditions, wheel braking, sudden acceleration with resultant movement between the lug nut and the soft aluminum seat. This results in significant wear on the aluminum seat and also causes the corners of the hexagonal portion of the lug nut to literally dig into the soft aluminum seat.

Steel inserts have been used in the stud-receiving openings of non-ferrous wheels in order to eliminate some of the deformation of the aluminum or other non-ferrous wheel when a lug nut is tightened against the wheel. These inserts are all provided with integral skirts and the skirts are provided with a knurled surface on the exterior wall of the cylindrically shaped skirt. In this way, the conical section of the insert fits within the conically shaped portion of the stud-receiving opening and the cylindrically shaped skirt fits within the cylindrically shaped portion of the stud-receiving opening and locks the insert in this stud-receiving opening by virtue of the frictional fit of the knurls against the wall of the stud-receiving opening.

One of the principal problems with the use of this type of insert is the fact that it is necessary to literally machine the knurled surface or other serrations on the exterior wall of the skirt. Moreover, these inserts must be forged from steel and cannot be stamped from thin sheet metal, due to the need of the skirt and particularly, the knurling on the exterior surface thereof. The knurling on the exterior wall of the skirt is important to overcome differences in tolerance. If the skirt is not precisely sized to fit within the cylindrically shaped portion of the stud-receiving opening, then the insert can literally fall out of the stud-receiving opening during shipment or handling of the wheel. Even more importantly, the steel insert can be readily dislodged from the stud-receiving opening during the mounting of the wheel and interfere with installation of the wheel. If the wheel were actually installed without the insert, the lug nut would neither align the wheel properly nor provide sufficient seating area and this could become a significant road hazard.

Inasmuch as these prior art inserts have been formed of forged steel, they weigh as much as four to six times the amount of equivalent stamped sheet metal inserts. Due to the fact that there is a substantial decrease in weight by using a stamped sheet metal insert, there is a far less possibility of wheel imbalance occurring.

In the case of standard OEM steel wheels, a torsion ring is used. The steel wheels are frequently constructed so that a portion of the wheel surrounding the stud-receiving opening actually functions as a type of torsion ring. This creates a Belleville spring effect. Thus, when a lug nut is tightened against a steel wheel, the wheel surface around the lug nut will actually deflect slightly, causing a spring loading on the lug nut. This spring loading or Belleville effect actually places the lug nut under compressive force loading on the vehicle wheel stud and prevents the lug nut from vibrating loose on the vehicle wheel stud.

There have been several attempts to duplicate the torsion ring effect of steel wheels in the manufacture of aluminum and other non-ferrous wheels. However, these attempts have not met with success, particularly in the case of aluminum wheels. Aluminum, in particular, is not a desirable spring material. Furthermore, the thickness of the aluminum wheel in the lug nut mounting area, that is, around the stud-receiving holes, is actually four times thicker then in a corresponding steel wheel. As a result, the aluminum wheel manufacturers were not able to obtain any effective Belleville spring effect.

Another one of the problems which arise in the case of non-ferrous wheels is the problem of accurately centering the wheel on the studs projecting outwardly from the vehicle hub so that each stud is concentrically located at the exact diametral center line of the stud-receiving hole in the vehicle wheel. When the vehicle wheel is initially placed onto the vehicle, the weight of the wheel effectively rests on one or more studs and particularly, the uppermost studs. When the lug nut is tightened against the conical seat of the vehicle wheel, it actually causes a raising of the wheel in an effort to center the wheel with respect to the vehicle stud. The forcing of the steel lug nut against the soft aluminum conically shaped seat literally destroys the accuracy of this aluminum seat.

In order to improve the aesthetics of the wheel mounting arrangement, many users of non-ferrous wheels will employ chrome plated lug nuts for securing the wheel on the vehicle studs. However, when a chrome plated lug nut having an exterior conically shaped surface is tightened onto a conically shaped aluminum surface, the chrome on the lug nut will gall the aluminum seating surface. This galling of the aluminum seat effectively destroys the seat and particularly, the ability to accurately center the wheel with respect to the studs. This problem has been observed by many major automotive manufacturers and, as a result, these manufacturers have written specifications to allow for some galling of the aluminum wheel. Other automotive vehicle manufacturers prohibit the use of, or strongly recommend against the use of chrome plated lug nuts on aluminum and other non-ferrous wheels.

Wheel inserts which are presently used on aluminum wheels are made on headers and screw machines. The header used to manufacture an insert is a very expensive piece of equipment with a cost easily exceeding $1,000, 000.00. In addition, the initial tooling costs alone are $30,000.00. It would be necessary to utilize a header for producing these steel inserts in order to produce the inserts at a cost which is not prohibitive.

The applicant has taught of the use of inserts in vehicle wheel nut assemblies for securing non-ferrous wheels to the hub of a vehicle as, for example, in U.S. Pat. No. 4,898,429 dated Feb. 6, 1990 for "Vehicle Wheel Assembly." However, the inserts taught in this U.S. patent all required the use of a cylindrically shaped skirt portion surrounding the conical seat. Moreover, this invention taught the use of lug nuts, each having a body section with tool-engaging walls and a skirt located on and extending axially from the tool engaging walls of the lug nuts. However, in accordance with the invention in this U.S. Pat. No. 4,898,429, and due to the fact that the lug nuts were of a different construction, a means to retain the insert in the stud-receiving opening was not addressed.

Others have proposed the use of inserts in vehicle wheels as, for example, in U.S. Pat. No. 3,329,468 dated Jul. 4, 1967 for Wheel Structure, U.S. Pat. No. 3,811,737, dated May 21, 1974 for a Reinforced Resin Wheel, U.S. Pat. No. 4,679,860 dated Jul. 14, 1987 for a Wheel Assembly For Vehicle, and U.S. Pat. No. 3,988,038 dated Oct. 26, 1976 for a Universal Wheel System. Other prior art wheel inserts have been taught in Offenlegungsschrift No. 2026332 dated Dec. 17, 1970 and Japanese Patent No. 60-197101 for Built-Up Wheel for Vehicles, by Honda Giken Nogyokk.

There has been a need for some arrangement, including a steel insert which would allow the use of a steel lug nut for securing a non-ferrous wheel to the wheel hub of a vehicle. The use of this insert would provide a torsion ring effect for an aluminum wheel and thereby prevent the lug nuts from becoming loose as a result of vibrational effects on the wheel. In like manner, it would be desirable to use some type of steel insert to eliminate the destruction of the aluminum seat surrounding the wheel stud when a steel lug nut is tightened against the aluminum wheel. It is also desirable to allow the use of plated lug nuts, e.g., chrome plated lug nuts for securing the wheel to a wheel hub of a vehicle.

OBJECTS OF THE INVENTION

It is, therefore, one of the primary objects of the present invention to provide a wheel nut arrangement which allows the use of a steel lug nut for securing a non-ferrous wheel to the hub of a vehicle.

It is another object of the present invention to provide a vehicle wheel insert for mounting in the lug nut opening of a vehicle wheel and which is provided with a unique locking arrangement for retentively locking the insert within the stud-receiving opening of a vehicle wheel.

It is also an object of the present invention to provide a vehicle wheel insert of the type stated which allows for the provision of a torsion ring effect and which also prevents lug nuts from loosening during wheel vibration.

It is a further object of the present invention to provide a wheel insert of the type stated which allows for the tightening of a vehicle wheel lug nut to secure a non-ferrous wheel to a vehicle hub without destroying the soft aluminum conically shaped seat and hence, the accuracy of the seat in a non-ferrous wheel.

It is an additional object of the present invention to provide a vehicle lug nut arrangement in which chrome plated lug nuts can be used without the attendant problem of galling the aluminum seating surface.

It is an additional object of the present invention to provide a lug nut arrangement which allows for the use of an insert capable of being manufactured at a very low cost and which can be effectively stamped from stock material.

It is another salient object of present invention to provide a lug nut arrangement of the type stated which is highly effective in use and which can be used with a wide variety of different types of non-ferrous vehicle wheels.

It is still another object of the present invention to provide a method of securing a non-ferrous vehicle wheel to a wheel hub of a vehicle by the use of steel lug nuts without galling or otherwise destroying the vehicle wheel seat.

With the above and other objects in view, my invention resides in the novel features of form, construction, arrangement and combination of parts presently described and pointed out in the claims.

BRIEF SUMMARY OF THE DISCLOSURE

A vehicle lug nut arrangement in the form of an assembly comprised of at least a frusto-conically shaped insert and a lug nut for tightening the vehicle wheel on a vehicle stud projecting through a stud-receiving opening of the wheel. The invention is highly effective for the use of a steel insert in securing a non-ferrous wheel to the steel hub of the vehicle.

The use of a steel insert allows a torsion ring effect which would not otherwise be achievable in an aluminum or similar non-ferrous wheel. The insert becomes adhered to the wall of the stud-receiving opening and will operate as a surface against which the steel lug nut may bear. In a preferred embodiment, the insert deflects against the wheel opening by the force of the lug nut tightened on the stud to thereby provide a Belleville spring effect. Thus, a spring-type loading is imposed on the lug nut which prevents an unauthorized vibrational unwinding of the lug nut.

In the case of the present invention, steel inserts are employed, although it should be understood that other types of metal inserts could be used. It is important in connection with the present invention that the insert which is used have a hardness which is greater then that of the wheel. The non-ferrous wheel is typically formed of a soft material such as aluminum or the like. However, other non-ferrous materials could be used in the construction of the vehicle wheel.

The non-ferrous wheel typically has a much greater cross sectional thickness then does the steel wheel. However, this thickness also results in a shorter protruding stem length of threaded stud for securement of a lug nut. As a result, there is a much greater tendency for a lug nut to become vibrationally unwound from the end of the stud when securing a non-ferrous wheel to the hub of the vehicle. The Belleville spring effect which actually imposes a force on the nut, effectively clamps the nut on the stud to thereby preclude an unwanted vibrational unwinding.

The vehicle wheel insert is disposed in the stud-receiving opening of the non-ferrous vehicle wheel. The insert comprises a continuous frusto-conically shaped body section which is adapted for fitted disposition into the conically shaped portion of a stud-receiving opening of this vehicle wheel. The body section terminates in a circular upper opening and a circular lower opening to allow a vehicle wheel stud to extend therethrough.

In the preferred embodiment of the steel insert, the upper opening is sized to accommodate a lug nut which is to be secured to a stud extending through the upper and lower openings and allows the lug nut to bear against a surface of the body section. The insert has a conically shaped body which is tightly fitted within the frusto-conically shaped portion of a stud-receiving opening. The body also has an exterior surface which engages and conforms to an interior surface of the frusto-conically shaped portion of the stud-receiving opening.

The inserts of the invention are primarily used with steel lug nuts. In this case, the lug nuts conventionally have a tool-receiving section and a tapered section extending axially outwardly from the tool receiving section. The tapered section is conically shaped and has a surface which is sized to extend into and conforms to an interior surface of the insert body. In effect, the combination of the lug nut and the insert operate as a locking means to cause the insert to be tightly locked in the stud-receiving opening. As the lug nut is tightened on the stud, the tapered end of the lug nut bears against the insert and literally forces the same into tight contact with the frusto-conically shaped surface of the stud-receiving opening. When in this position, the insert also provides a torsion ring and creates a Belleville-type spring effect which bears against the lug nut.

Another one of the important aspects of the present invention is the fact that there are several unique locking means for permanently physically locking the insert within the stud-receiving opening of the wheel. In one of these embodiments, the insert may be created with an upper annular edge which creates an interference with the wall of the stud-receiving opening thereby permanently locking the insert in the stud-receiving opening. In another embodiment, the insert may be physically locked within the stud-receiving opening by means of a staking. In this case, a steel or other hard metal tool or member is used to strike the portion of the wheel surrounding the stud-receiving opening and deform the wheel to thereby literally encapsulate the rim of the insert in the stud-receiving opening.

In still another embodiment, a swaging effect is employed. The insert may initially be provided with a skirt and a metal tool, or other implement, which is preferably conically shaped, is used to strike the lower end of the skirt on the interior wall thereof, thereby flaring the end of the skirt so that it is effectively swaged to the wheel.

Each of the aforesaid modes of locking the insert in the stud-receiving opening are highly effective in that they preclude the insert from becoming removed from the opening. Moreover, and by using these locking techniques, it is also possible to literally stamp the insert from sheet metal at a relatively low cost. Consequently, it is not necessary to use a considerably more expensive and the considerably higher weight insert form of forged steel and which in many cases requires machining operations.

Another one of the unique advantages achieved by the locking means described herein is the fact that the insert itself is of a light weight sheet metal thin-walled construction. This actually increases the overall performance of the wheel in that the heavy weight of the steel inserts which often leads to unbalancing of the wheel is completely avoided.

In another embodiment of the invention, the insert is provided with an upper circular flange surrounding the open upper end of the body. Although the insert of the invention can be staked in the stud-receiving opening, the upper circular flange can aid such that the soft aluminum metal is deformed over the flange. As indicated above, staking can still result without the flange. Further, and while an interference effect of the type described above can be created without the flange, the interference locking effect can also result using the edge of the flange to create an interference between the surface of the wheel surrounding the stud-receiving opening and the edge of the flange.

In another embodiment, the flange on the insert can be provided with a plurality of recesses or serrations so that the peripheral edge of the flange can effectively bite into the soft aluminum metal. This will preclude rotation of the insert when the steel lug nut is threadedly rotated on the stud projecting through the stud-receiving opening.

The insert is effective when tightly held in the opening, due to the fact that it may be deflected to cause a locking action in the stud-receiving opening. This deflection is caused by the lower portion of the lug nut, and particularly the tapered section which bears against the insert. However, this also creates a type of Belleville-type spring effect which operates against the lug nut itself, causing the same to remain tightly secured on the threaded stud.

This invention possesses many other advantages and has other purposes which may be made more clearly apparent from a consideration of the forms in which it may be embodied. Several of the preferred forms of the invention are more fully described in the following detailed description of the invention, and are more fully illustrated in the accompanying drawings. However, it is to be understood that this detailed description and the accompanying drawings are not to be taken in a limiting sense, and are only illustrative of preferred embodiments of the invention.

BRIEF DESCRIPTION OF THE DRAWINGS

Figure 1:
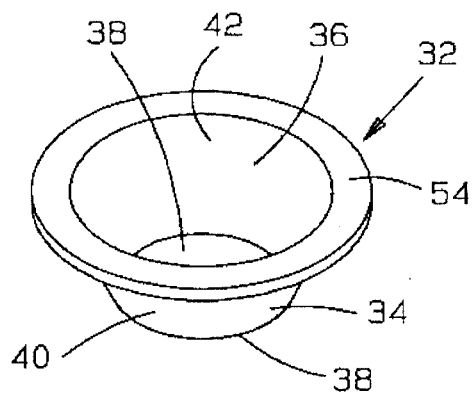
Figure 2:
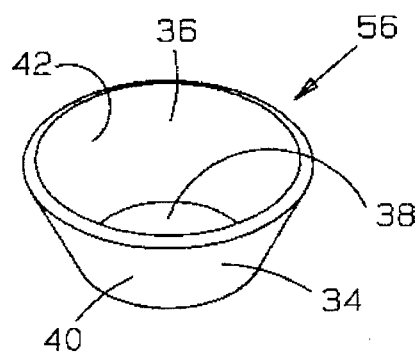
Figure 3:
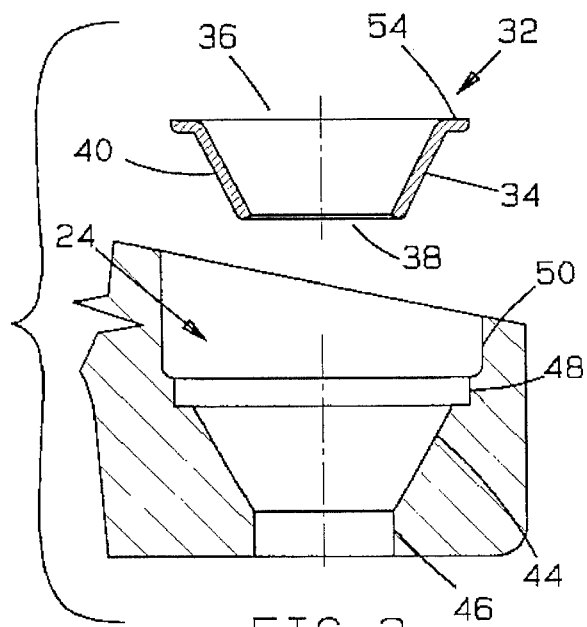
Figure 4:
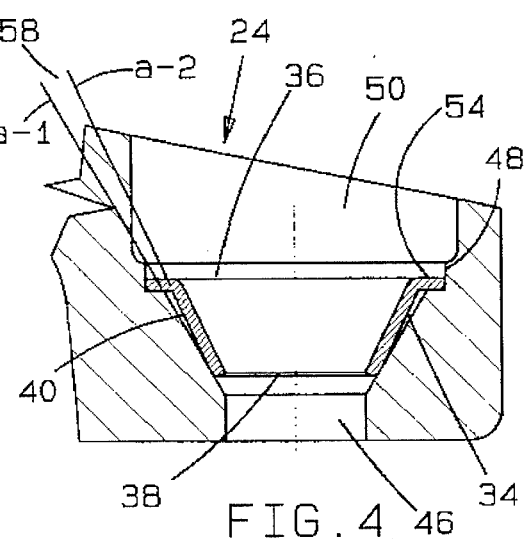
Figure 5:
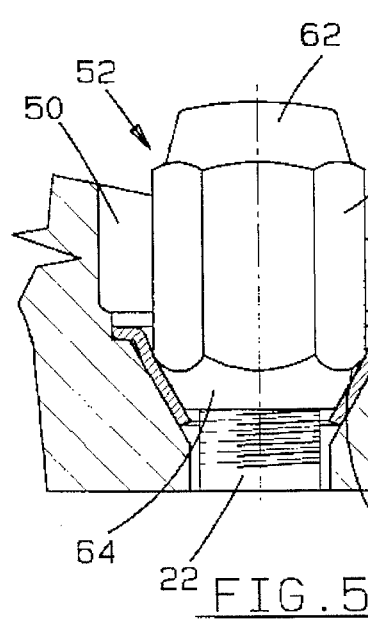
Figure 6:
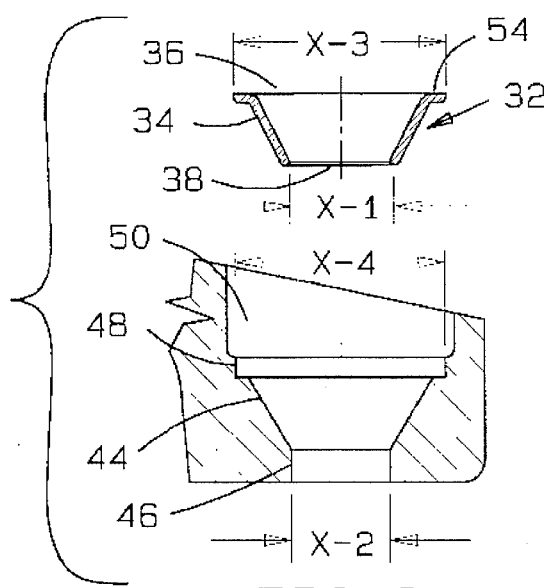
Figure 7:
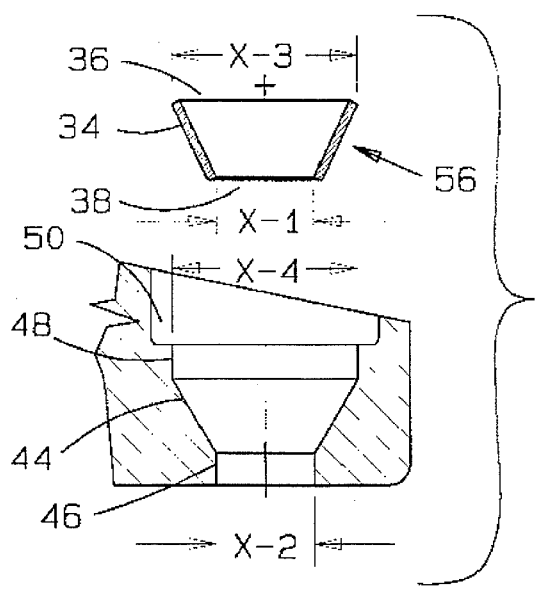
Figure 8:
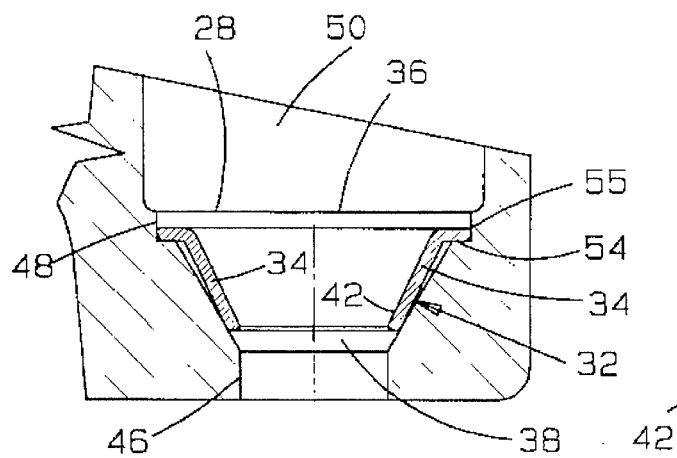
Figure 9:
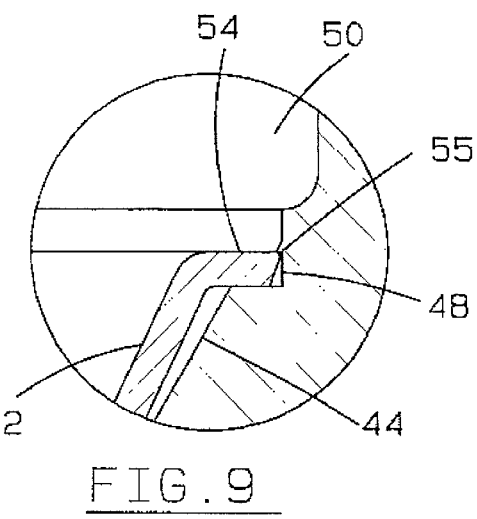
Figure 10:
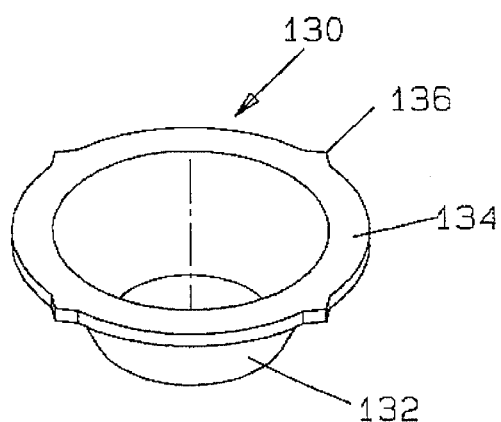
Figure 11:
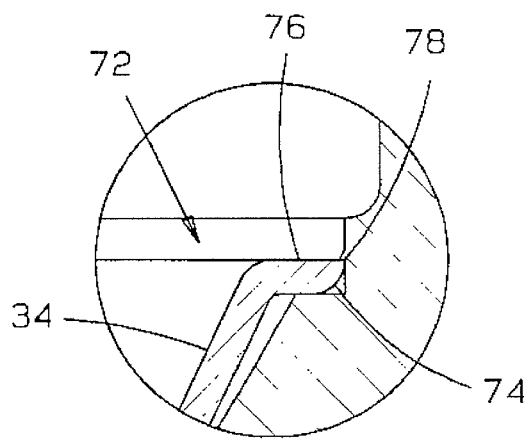
Figure 12:
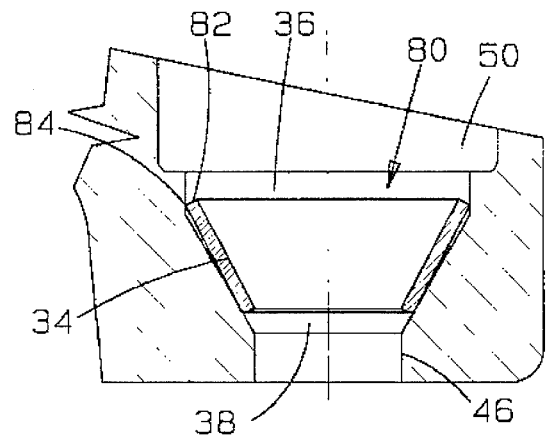
Figure 13:
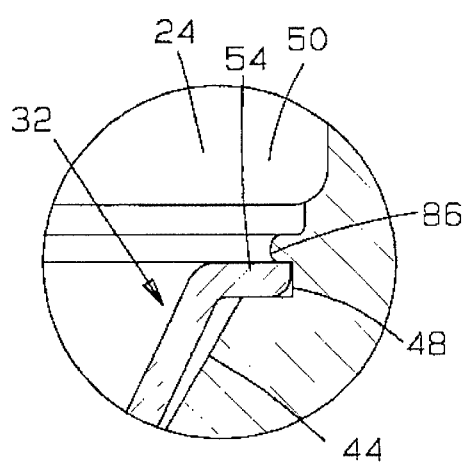
Figure 14:
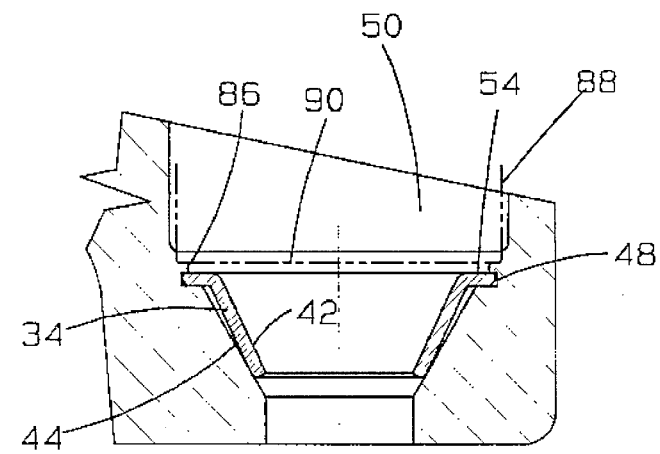
Figure 15:
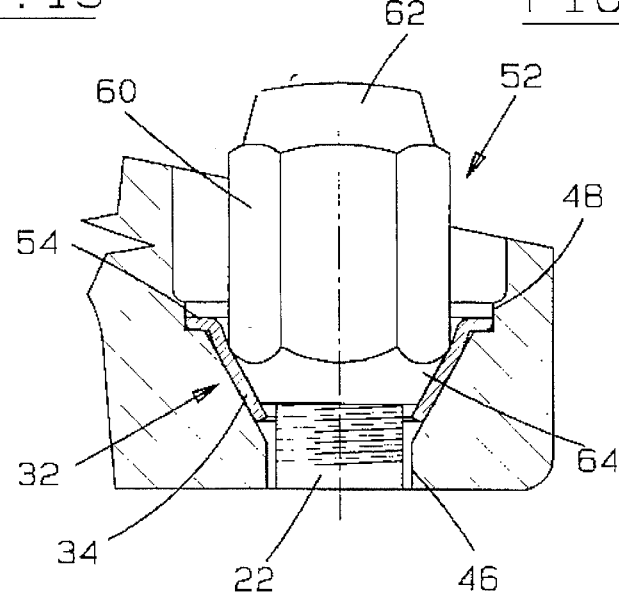
Figure 16:
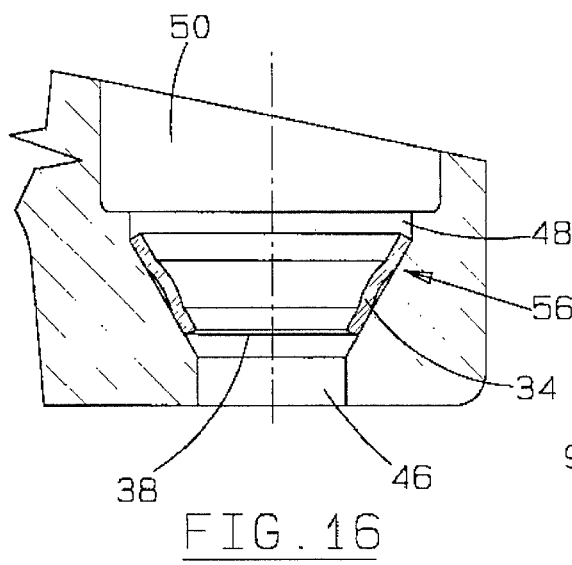
Figure 17:
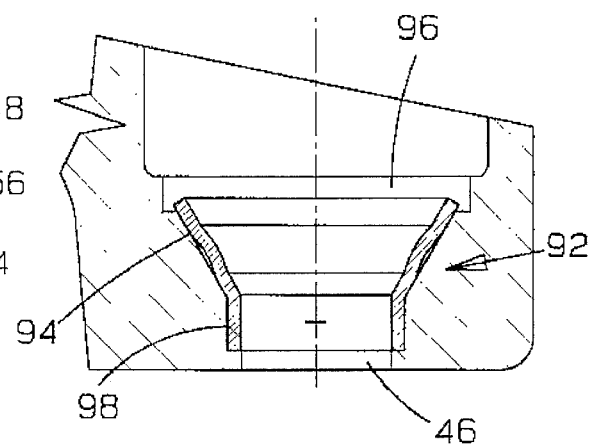
Figure 18:
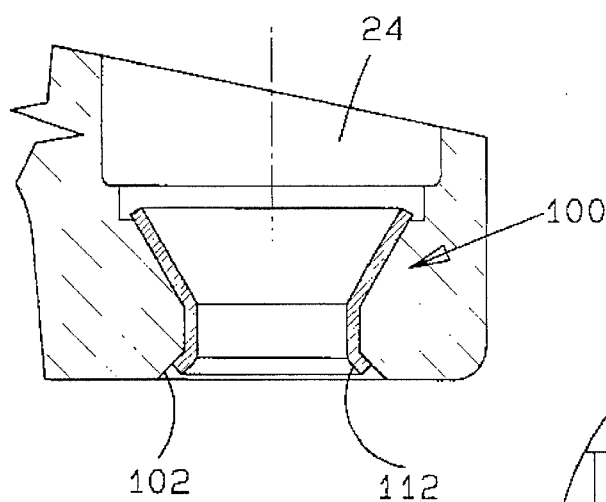
Figure 19:
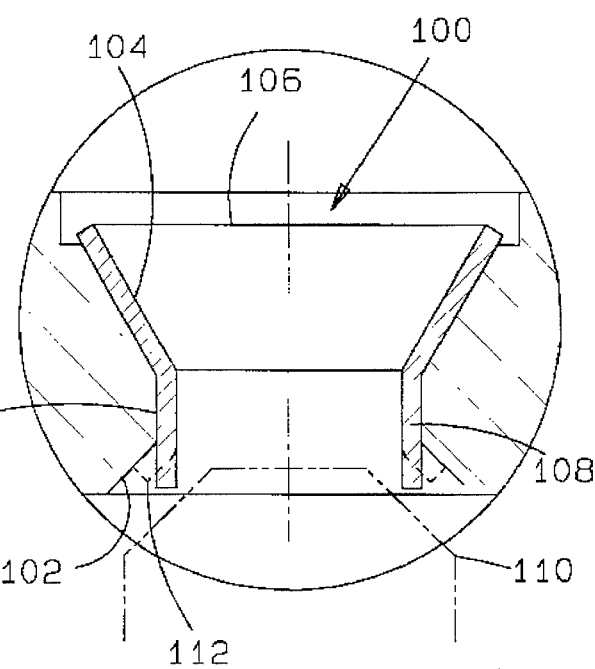
Figure 20:
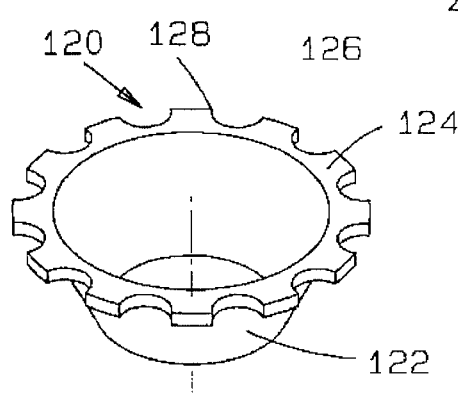
Figure 21:
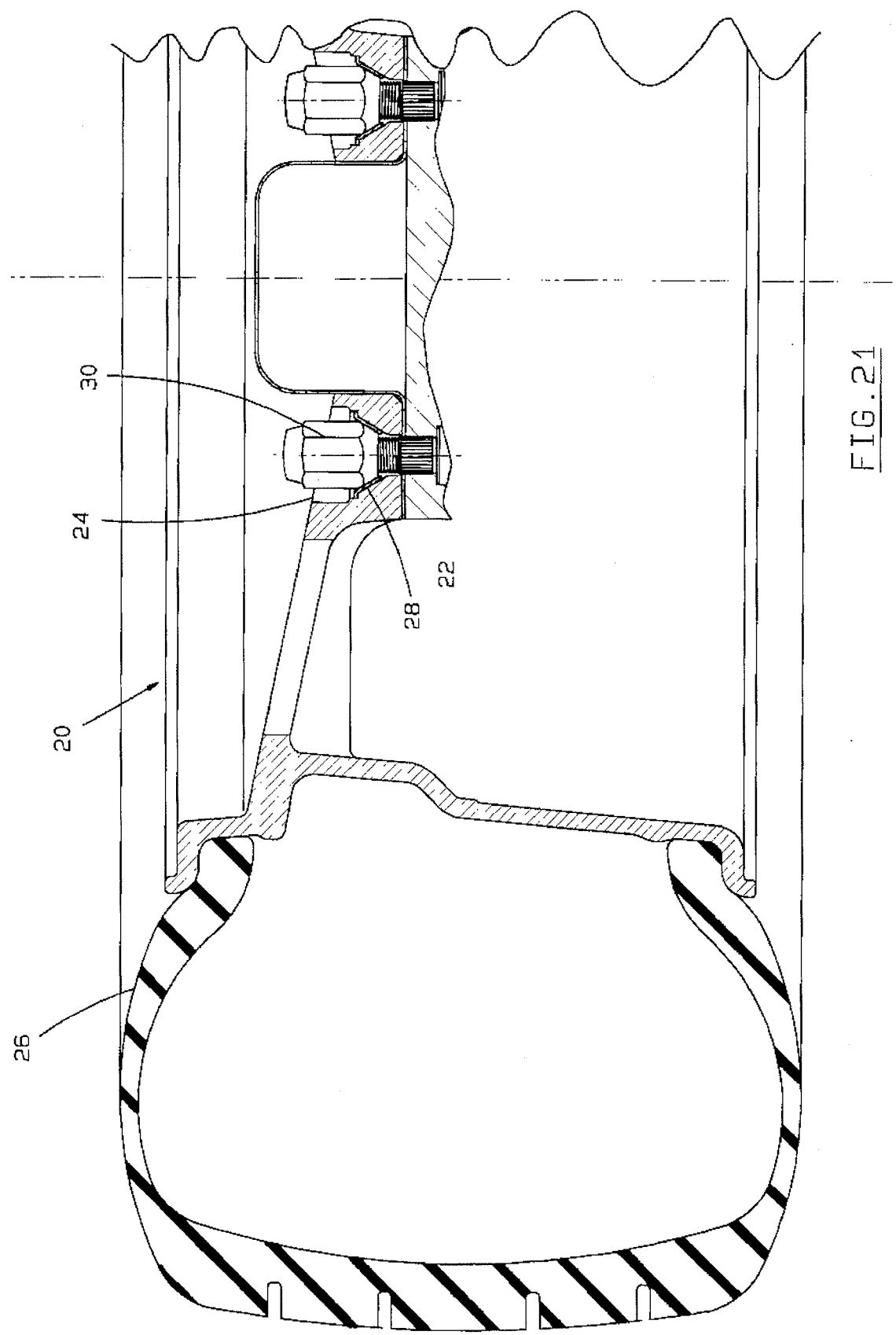

Having thus described the invention in general terms, reference will now be made to the accompanying drawings in which:

FIG. 1 is a perspective view of an insert constructed in accordance with and embodying the present invention;

FIG. 2 is a perspective view of a modified form of insert in accordance with and embodying the present invention;

FIG. 3 is an exploded view, partially in section, and showing an insert arrangement for disposition in the stud-receiving opening of a vehicle wheel;

FIG. 4 is a vertical sectional view showing the fitting of an insert of the type used in FIG. 1 in the stud-receiving opening of a vehicle wheel before securement of a lug nut on a stud projecting through the insert;

FIG. 5 is a vertical sectional view showing a deflection of the insert caused by the securement of a lug nut onto a vehicle wheel stud;

FIG. 6 is a vertical sectional view showing the size relationship of an insert with respect to a stud-receiving opening for the embodiment of the insert of FIG. 1;

FIG. 7 is a sectional view, somewhat similar to FIG. 6, and showing the size relationship of the insert of FIG. 2 and a stud-receiving opening of a vehicle wheel;

FIG. 8 is a vertical sectional view showing a securement of an insert into a stud-receiving opening by the effect of interference;

FIG. 9 is an enlarged sectional view, somewhat similar to FIG. 8, and more fully showing the interference effect of locking the insert in a stud-receiving opening of a vehicle wheel;

FIG. 10 is a further fragmentary enlarged sectional view, similar to FIG. 9, and showing still another form of insert for achieving an interference effect to cause the locking of the insert in the stud-receiving opening;

FIG. 11 is a vertical sectional view showing the locking of another modified form of insert in a stud-receiving opening by interference effects;

FIG. 12 is a vertical sectional view showing the interference effects achieved through the locking of still a further modified form of insert constructed in accordance with the present invention;

FIG. 13 is a vertical sectional view, somewhat similar to FIG. 8 and showing the securement of an insert in a stud-receiving opening of a vehicle wheel by the effect of staking;

FIG. 14 is a fragmentary enlarged vertical sectional view more fully illustrating the effects of staking an insert into a stud-receiving opening and the means to achieve the staking operation;

FIG. 15 is a side elevational view, partially in section and showing the wedging of an insert in a stud-receiving opening by the clamping effect of a lug nut;

FIG. 16 is a side elevational view, partially in section, and showing the Belleville spring effect created by an insert disposed in a stud-receiving opening;

FIG. 17 is a vertical sectional view showing an insert press-fitted into a stud-receiving opening;

FIG. 18 is a vertical sectional view showing an insert having a swage fitted securement within a stud-receiving opening of a vehicle wheel;

FIG. 19 is a vertical sectional view, somewhat similar to FIG. 18, and showing the means of achieving the swaging of the insert in the stud-receiving opening of a vehicle wheel;

FIG. 20 is a perspective view of another slightly modified form of insert constructed in accordance with and embodying the present invention; and FIG. 21 is a side elevational view, partially in section, and showing the mounting of a vehicle wheel using the inserts of the present invention.

DETAILED DESCRIPTION OF PREFERRED EMBODIMENTS

Referring now in more detail and by reference characters to the drawings which illustrate several practical embodiments of the invention, FIG. 21 more fully illustrates a mounting of a vehicle wheel, such as an aluminum wheel 20, to the threaded studs 22 projecting outwardly from the wheel hub of the vehicle. In this case, it can be observed that the vehicle wheel, which is in the form of an aluminum wheel, is provided with a plurality of openings (usually four to eight openings) 24 which axially receive the externally threaded studs 22.

The vehicle wheel 20 is conventional in construction and is therefore not described in any further detail herein. However, as shown in FIG. 21, the wheel is conventionally provided with a tire 26.

In accordance with the present invention, an insert 28 is schematically illustrated as being fixed within the stud-receiving opening 24. Moreover, it can be observed that the stud-receiving opening 24 is conically shaped, or at least has a conically shaped portion, and the insert 28 itself is conically shaped to seat within the conically shaped portion of the stud-receiving opening 24. A lug nut 30 is provided for securement to the externally threaded stud 22 to thereby rigidly hold the wheel 20 onto the studs 22 of the vehicle.

Referring now to FIG. 1, one of the inserts 32 is more fully illustrated and comprises a hollow body 34 with an opened upper end 36 and an opened lower end 38. The opened upper end 36 and the lower end 38 are sized sufficiently so as to allow a stud of a vehicle hub to extend therethrough. The frusto-conically shaped body 34 has an exterior frusto-conically shaped exterior side wall 40 and an interior frusto-conically shaped side wall 42. The exterior side wall 40 of the insert 32 will bear against a frusto-conically shaped side wall section 44 of the stud-receiving opening 24, as best shown in FIG. 3.

Referring now in more detail to FIG. 3, it can be seen that the stud-receiving opening 24 initially has a cylindrically shaped stem-receiving section 46 which merges into the frusto-conical side wall section 44. Furthermore, the frusto-conical side wall section 44 has a diametrally enlarged shoulder forming recess 48, the lower flat wall of which functions as a shoulder, as illustrated. This shoulder-forming recess 48, in turn, merges into a cylindrically shaped nut-receiving section 50, the latter of which is designed to receive a conventional lug nut, such as the lug nut 52 illustrated in FIG. 5.

Turning again to FIG. 3 and to FIG. 4, it can be observed that the insert 32 will fit within the stud-receiving opening 24 and the frusto-conically shaped body 34 will fit within the frusto-conically shaped section 44 of the stud-receiving opening 24 in the manner as illustrated. In this case, the insert 32 is securely retained in the opening 24 in a manner to be hereinafter described in more detail.

In the embodiment of the insert 32, as illustrated in FIG. 1, the body 34 integrally merges into an outwardly extending annular ring flange 54. When mounted in the stud-receiving opening 24 the annular ring flange 54 will sit within the enlarged shoulder-forming recess 48, as illustrated in FIGS. 4 and 5 of the drawings.

FIG. 2 illustrates a slightly modified form of insert 56. This modified form of insert 56 is substantially identical to the insert 32, except for the fact that it does not have a ring flange 54 surrounding the upper open end 36.

Although not critical in the present invention, there may be a differential angle between the angle of taper of the conically shaped wall of the insert and the conically shaped wall of the stud-receiving opening. This facilitates the allowance of a Belleville spring effect, as hereinafter described in more detail. However, it is not absolutely necessary to provide this differential angle of taper, although it can be preferred in many embodiments.

Referring again to FIGS. 4 and 5, it can be observed that the frusto-conically shaped body 34 of the insert preferably has an angle of taper which is slightly less then that of the conically-shaped side wall section 44 of the stud-receiving opening 24. Thus, in FIG. 4, it can be observed that the exterior frusto-conically shaped side wall surface 40 of the insert has an angle of taper a-2 and the interior conically-shaped side wall section 44 of the opening 34 has an angle of taper a-1, thereby providing a differential angle 58. The angle a-2 is normally slightly smaller than the angle a-1. Thus, it can be observed that there may actually be some clearance between the upper end of the frusto-conically shaped body 34 and that of the frusto-conically shaped section 44 of the stud-receiving opening 24. The lug nut 52 is provided with a tool-receiving side wall 60 and a somewhat tapered upper end 62, as well as a conically shaped, tapered skirt 64, as shown in FIG. 5. In this respect, the lug nut 52 is of a generally conventional construction. However, it can be observed that the tool-engaging surface 60 has a lower end 66 which engages and bears against the interior conically shaped side wall surface 42 of the body 34 of the insert 32. Thus, when the lug nut 52 is tightened on the threaded stud 22, it will create a compressive force on the lug nut 52 forcing the lower end 66 into the side wall 44 of the body 34. As this occurs, the body will deflect somewhat as also shown in FIG. 5, thereby causing the body to become rigidly secured within the stud-receiving opening.

The lodging of this insert 32 in the stud-receiving opening, and particularly where there is a differential angle between the conically shaped wall of the insert and the conically shaped wall of the stud-receiving opening, has the unique effect of creating a Belleville spring-type action. Because the steel insert 32 itself has some resiliency, there is a tendency of the insert 32 to react against the action of the lug nut 52. This, in effect, creates a force against the lower edge 66 of the lug nut 52 which would cause the lug nut 52 to shift axially along the stud 22. However, due to the fact the lug nut 52 is tightened on the externally threaded section of the stud 22, the threads of the nut and the stud interfere and thereby lock against one another. Due to the fact that the lug nut 52 is also under a type of compressive force, as a result of its being threadedly secured on the stud and being forced by the Belleville spring action of the insert 32, the lug nut is precluded from unathorizedly unwinding from the stud.

FIGS. 6 and 7 show the size relationship of the insert 32 and the modified form of insert 56 with respect to the stud-receiving openings. In this case, and by reference to FIG. 6, it can be seen that the lower opened end 38 of the insert 32, and particularly the side wall 34 at its lower opened end, has a size which is generally equal to the overall diametral size of the stud-receiving opening. In fact, the diametral size is absolutely no less than that of the stud-receiving opening. The flange 54 on the insert is, again, approximately equal to the diametral size of the shoulder area 48 merging into the frusto-conically shaped section 44 of the stud-receiving opening. Here again, the flange can have a slightly greater dimension in order to create a tight interference effect in the shoulder-forming recess 48. In this way, the flange will tightly engage the annular wall of the recess 48, as hereinafter described in more detail.

Specifically, and by further reference to FIG. 6, it can be observed that the lower end of the insert has a size X-1 which is approximately slightly greater than the diameter of the cylindrical section X-2. In this way, a stud initially projecting through the stud-receiving opening will not engage the lower end of the insert and force the same outwardly from the stud-receiving opening. The upper end of the insert, including the ring flange 54, has a dimension X-3, which is approximately equal to the diameter of the shoulder-forming recess 48. The diameter of the shoulder is identified by the dimension X-4 in FIG. 6. The flange 54 may actually have a slightly greater diametral size than the shoulder-forming recess 48 in order to create a tight interference effect. However, the flange size can be slightly less than the shoulder-forming recess 48 when other types of locking, such as staking, is to be employed, as hereinafter described.

The size differential between the components of the insert and the stud-receiving opening is not significantly large and is generally measured in mils. The relationships of the sizes of the insert components to that of the stud-receiving opening are also more fully described hereinafter in connection with the locking of the inserts in the stud-receiving opening.

The overall size relationship of the modified form of insert 56, as shown in FIG. 7, is essentially the same with the recognition that the modified insert 56 does not contain the ring flange 54. However, and in this case, the modified insert 56 will fit within the frusto-conically shaped portion 44 of the stud-receiving opening 24.

FIG. 8 illustrates the retention of an insert, such as the insert 32 in the stud-receiving opening by means of an interference action. In this case, it can be observed that the edge of the ring flange 54 fits tightly within the shoulder-forming recess 48 and bears against the shoulder therein. The insert 32 is forced into the conically shaped portion 44 of the stud-receiving opening 24 until the ring flange 54 sits firmly within the seat formed by the shoulder-forming recess 48.

FIG. 9 is an enlarged vertical sectional view showing the details of the interference effect. In addition, FIG. 10 illustrates a further enlarged vertical sectional view showing the details of this interference effect. In this case, it can be seen that the upper annular edge 55 of the ring flange 54 physically engages and is actually forced into the wall of the shoulder forming region 48. The upper edge, if desired, could be formed with a slightly greater overall diameter than the remaining portion of the ring flange 54. However, if the ring flange 54 is sized to tightly fit within the shoulder forming recess 48, then any force which tends to push the insert out of the stud-receiving opening will cause this upper edge to engage the softer aluminum metal and effectively bite into the metal to become thereby permanently lodged in the stud-receiving opening.

FIG. 11 illustrates still a further modified form of insert 72 which may be used in connection with the present invention. In this case, the insert 72 is similar to the previously described insert 28, except that the insert 72 is provided with a somewhat rounded annular wall on its rounded annular wall 74 on its ring flange 76. The flange 76 also terminates in a sharp annular edge 78 which is adapted to again bite into and tightly engage the softer metal of the stud-receiving opening, as best illustrated in FIG. 11 of the drawings.

FIG. 12 illustrates a slightly modified form of insert 80 similar to the previously described insert 56 of FIG. 2. However, in this case, the insert 80 is provided with a slightly beveled upper annular wall 82 terminating in a sharp annular outer edge 84. Thus, by further reference to FIG. 12, it can be seen that the upper annular wall 82 converges downwardly and outwardly into the annular conically shaped side wall of the insert. As illustrated in FIG. 12, the upper edge is beveled as shown, that is, it converges downwardly and outwardly. However, the upper edge could be flat, much in the same manner as in connection with the insert 56. Further, any angle of bevel could be employed in connection with the inserts of the invention. Nevertheless, in all cases, the edge 84 is effective in that this edge 84 is capable of biting into and retentively holding the insert 80 within the wall of the stud-receiving opening.

FIG. 13 illustrates the locking of an insert, such as the insert 32, in the conically shaped portion 44 of the stud-receiving opening 24 by means of a staking action. In this case, it can be seen that the ring flange 54 actually fits within the shoulder-forming recess 48. The insert 32 is locked into the stud-receiving opening through a deformation of a wall of the stud-receiving opening and particularly, a portion of the wall forming the cylindrically shaped nut-receiving section 50, so as to form an annular stake 86 which extends around and sits upon the upper surface of the ring flange 54, as best illustrated in FIGS. 13 and 14 of the drawings.

A tool, or other metal implement, 88, having a relatively flat bottom wall 90, is placed upon and engages just the surface of the nut-receiving section 50 as it merges into the shoulder-forming recess 48. This metal implement or tool 88 is then struck with sufficient force so as to deform the portion of the stud-receiving opening to form the annular projection 86, or so-called "stake." In this way, it can be seen that the insert 28 is retentively held within the stud-receiving opening.

It should also be understood in connection with the present invention that it is not necessary to create an annular stake around the upper edge of the insert. Staking can occur at various points surrounding the upper annular edge of the insert or, for that matter, the flange 54 on the insert, if one is employed. Thus, the user could strike the softer aluminum metal with a blunt small instrument to create a plurality, e.g., three points around the insert to form three individual stakes.

FIG. 17 illustrates a modified form of insert 92 which has a frusto-conically shaped body 94 and an opened upper end 96. The body 94 is also integrally provided with a cylindrically shaped depending skirt 98, as best shown in FIG. 17. The skirt 98 has a size approximately equal to the stud-receiving opening 46. However, the outer diameter of the skirt 98 is sized so as to very snugly fit within the opening. The insert 92 is thus press-fitted into the stud-receiving opening.

It can be seen that the insert 92 has both the conically shaped section fitted within the conically shaped portion 44 of the stud-receiving opening, and the cylindrically shaped section fitted within the cylindrically shaped stem-receiving section 46 of the stud-receiving opening.

The insert 92 is somewhat similar to the prior art inserts which also use the skirt and thus, it is much more costly to produce and also has the increased weight when compared to the other inserts illustrated and described herein. In addition, the insert 92 also must have a close tolerance with respect to the stud-receiving opening and particularly, the conically shaped sidewall section and the cylindrically shaped stud-receiving section 46 of the stud-receiving opening. From this standpoint, the insert 92 is not necessarily preferred, although it will effectively operate with the Belleville spring action heretofore described and also, hereinafter described in more detail.

FIGS. 18 and 19 illustrate a modified form of insert 100 which is swaged into the stud-receiving opening 24 in the manner as shown. The stud-receiving opening 24 has a slightly diametrally enlarged lower end 102 which integrally merges into the stem-receiving section 46 of the stud-receiving opening. In many cases, the wheel is constructed so that the stem-receiving section 46 has a diametrally enlarged end, such as the end 102, as shown in FIG. 18. By reference to FIG. 19, it can be seen that the insert 100 is provided with a conically shaped wall section 104 equivalent to the body 34 and which opens into an upper end 106. The lower end of the conically shaped section 104 integrally merges into a cylindrically shaped skirt 108, as best shown in FIG. 19. The skirt 108 projects beyond the stem-receiving section 46 and into the region of the outwardly flared enlarged lower end 102.

The insert 100 is actually swedged into the stud-receiving opening by forcing the skirt 108 outwardly by means of a conically shaped tool 110, as also best illustrated in FIG. 19. By striking the tool 110, it can be seen that the lower end of the skirt 108 will be flared outwardly in the form of a swedge 112. In this way, the insert 100 will be retentively and permanently locked in the stud-receiving opening of the vehicle wheel.

Each of the above-described embodiments of the insert provide an effective means for securing the insert within the stud-receiving opening of a vehicle wheel. In many cases, the insert can be retained merely by forcing the side wall of the insert into and tightly against the conically shaped portion of the stud-receiving opening. In other cases, securement of the insert is achieved by the other means, as disclosed herein, as for example, interference, staking or the like.

FIGS. 15 and 16 more fully illustrate the Belleville spring-type action which results from the use of the inserts of the present invention. By reference to FIG. 15, it can be observed that the lower edge of the tool receiving side wall 60 of the lug nut bears against the interior surface of the frusto-conically shaped side wall of the insert. In addition, the tapered skirt 64 of the lug nut also bears against the side wall 34 of the insert 32. This effectively clamps the insert in the stud-receiving opening. Due to the fact that the insert itself has an angle of taper which is actually slightly greater than the angle of taper of the conically shaped seat of the stud-receiving opening, as shown in FIG. 14, for example, there is a tendency for the side wall of the stud-receiving opening to deflect outwardly. This will create a compressive force causing the side wall to buckle inward slightly, as shown in FIG. 16 of the drawings.

When the lug nut is forced against the interior surface of the frusto-conically shaped body of the insert, there is a spring-type action which is effectuated. This spring-type action operates against the action of the lug nut. In effect, the lug nut is partially captured on the stud from the wheel by virtue of the fact that it is threadedly mounted thereon. Thus, the lug nut is effectively clamped onto the stud of the wheel.

It can be seen by reference to FIGS. 15 and 16 that by the use of the simple insert and lug nut arrangement, as described herein, there has been achieved a torsion ring with a Belleville spring effect, much in the same manner as that which is achieved with a steel lug nut on a steel wheel. Thus, by use of the arrangement in the present invention, it is now possible to secure an aluminum wheel, or other soft metal wheel, to the hub of a vehicle with the same degree of accuracy and with the same adherence as that achieved with a steel wheel.

Also in accordance with the present invention, it can be seen that there are several means of physically and retentively locking an insert within the stud-receiving opening of a vehicle wheel. Moreover, these various means enable the physical locking of an insert in the stud-receiving opening, without the need of precision ground knurling on a cylindrically shaped skirt section of the insert. Furthermore, the insert is effectively locked, even though formed of a relatively thin-walled sheet metal.

FIG. 20 illustrates another slightly modified form of insert 120 which is similar to the previously described insert 32 in that the insert 120 has a frusto-conically shaped side wall 122 and an upper annular ring flange 124. In this case, the ring flange 124 is provided with a series of annularly extending radially inwardly projecting recesses 126. This provides for relatively sharp edges 128 at each of the opposite ends of the recesses 126, as best shown in FIG. 20. These edges 128 are effective in biting into the soft aluminum and thereby preclude rotation of the insert and any potential loosening effect when the lug nut is tightened on this stud projecting into the stud-receiving opening.

It should also be understood that other forms of an irregular edge on the flange 124 could be used. For example, the flange 124 could be provided with a serrated annular edge, or the like. FIG. 10, for example, illustrates an insert 130 which is similar to the previously described insert 32, as shown in FIG. 1, and includes a frusto-conically shaped side wall 132 integrally merging into an annular ring flange 134, as shown. In this embodiment, the ring flange 134 is provided with a plurality of circumfrentially spaced apart outwardly projecting tangs 136, as best shown in FIG. 10. In accordance with this construction, the tangs 136 will effectively bite into a soft aluminum stud-receiving opening wall and also preclude rotation of the insert and thereby avoid any potential loosening effect when a lug nut is tightened on a stud projecting into the stud-receiving opening. Furthermore, the tangs 136 also provide an effective means of seating and retentatively holding the insert within the stud-receiving opening against any axial displacement force.

It has been found in connection with the present invention, that the insert may be stamped from sheet metal and have a relatively thin wall thickness. When compared to a standard forged prior art insert, the insert of the present invention has significantly less metal and hence, less weight and is less costly to produce.

Thus, there has been illustrated and described unique and novel inserts and lug nut assemblies thereof for mounting non-ferrous vehicle wheels to a vehicle hub. The various forms of inserts provide a means for securing the same within the vehicle wheels and providing a biasing action on the lug nuts and thereby fulfill all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described the invention, what I desire to claim and secure by letters patent is:

1. A steel insert for use in stud-receiving openings of non-ferrous metal vehicle wheels and which openings each have a circularly shaped portion at an outer end thereof and a diametrically enlarged shoulder-forming wall surrounding the opening, said insert comprising:

(a) a continuous circularly shaped body section adapted for fitted disposition in the circularly shaped portion of a stud-receiving opening of a non-ferrous vehicle wheel;

b) said body section terminating in a circular upper opening distal to the vehicle wheel and having an arcuate dish-shaped upwardly opening lug nut receiving cavity and a lower circular opening proximate to the wheel without any skirt connected thereto and sized to allow a vehicle wheel stud to extend therethrough;

c) said upper opening and the lug nut receiving cavity being sized to accommodate a lug nut to be secured to a stud extending through the opening and allowing the lug nut to bear against an interior surface of said lug nut receiving cavity of said body section;

d) a circular ring flange at the upper opening extending around the upper opening and radially outwardly from an exterior surface of said body section to engage the diametrically enlarged shoulder-forming wall surrounding the lug nut receiving cavity and aid in retentively holding the insert in the stud-receiving opening; and e) said ring flange having an outer end wall lying in a plane generally parallel to an axial centerline passing through the body section and the upper and lower openings thereof, said end wall being engagable with said shoulder-forming wall in such manner that the circular ring flange constitutes the only effective locking means for locking the insert in the stud-receiving opening and where any skirt which may be present does not provide any significant locking action.

2. The steel insert of claim 1 wherein said circular ring flange is integral with said body.

3. The steel insert of claim 1 wherein said ring flange is sized to sit upon a seat formed by the shoulder-forming wall surrounding said stud-receiving opening.

4. The steel insert of claim 2 wherein said ring flange and said body each have a relatively constant thickness throughout.

5. The steel insert of claim 1 said flat outer annular flange end wall has an edge portion of sufficient sharpness to cut into the softer non-ferrous vehicle wheel.

6. The steel insert of claim 5 wherein said edge portion of sufficient sharpness is an upper circular edge of the ring flange.

7. The steel insert of claim 1 wherein said circularly shaped body section is a frusto-conical body section which is used in conically shaped portion of a stud-receiving opening of the vehicle wheel.

8. The steel insert of claim 1 further comprising a relatively flat annular end wall on the flange outer end wall and which end wall extends around the ring flange and lies in a plane parallel to the axial centerline passing through the body section and upper and lower openings thereof.

9. The steel insert of claim 1 wherein said body section is sufficiently thin-walled so that it will deflect under the force of a lug nut tightened thereagainst and aid in locking the insert in the stud-receiving opening.

10. An assembly comprised of at least a frusto-conically shaped insert and a lug nut for mounting a non-ferrous metal vehicle wheel onto a stud projecting outwardly from a wheel hub of the vehicle and through a stud-receiving opening of the wheel, and where the stud-receiving opening has a circularly shaped portion at the outer end thereof and a diametrically enlarged shoulder-forming wall surrounding the opening, said assembly comprising:

a) an insert having a circularly shaped body fitted within a circularly shaped portion of the stud-receiving opening, said body having a generally circularly shaped exterior surface with a portion thereof which engages and generally conforms to an interior surface of the circularly shaped portion of the stud-receiving opening, said body also having a circularly shaped interior surface;

b) a lug nut having a tool-receiving section and a tapered section extending downwardly from said tool-receiving section, said tapered section being circularly shaped and having a surface sized to extend into and conforming to an interior surface of said insert body;

c) said insert being formed of a metal which is harder than that of the non-ferrous wheel and also being formed of a selected steel and with sufficient thickness so that it has properties enabling it to deflect slightly under pressure and when subjected to the force of a lug nut bearing against the insert while being tightened on the stud causes a Belleville spring-type action when deflected; and d) said lug nut having a portion thereof which engages the interior surface of said insert body and causes a deflection of the insert to provide a Belleville spring-type action, the insert also being sufficiently resilient to provide a torsion ring effect such that it reacts against the action of the lug nut bearing against the insert creating an opposing force against the lug nut under the Belleville spring-type action and thereby locks the lug nut on the stud.

11. The insert of claim 10 wherein a portion of the body of the insert is deflected so that the exterior surface of the insert bears against the interior surface of the circularly shaped portion of the stud-receiving opening to cause a torsion ring effect.

12. The insert of claim 11 wherein the deflection of the insert is caused by a portion of the tool-receiving section of the lug nut bearing against the insert.

13. The insert of claim 10 wherein the circularly shaped body of the insert has a conically shaped body wall which fits within a frusto-conically shaped portion of the stud-receiving opening and that the conically shaped portion of the insert has an angle of taper different from the angle of taper of the frusto-conically shaped portion of the stud-receiving opening.

14. The insert of claim 13 wherein the angle of taper of the insert is less than the angle of taper of the frusto-conically shaped portion of the stud-receiving opening with respect to an axial centerline passing through the insert and stud-receiving opening.

15. A non-ferrous wheel arrangement for mounting a non-ferrous vehicle wheel to a wheel hub of a vehicle, said arrangement comprising:
   a) a non-ferrous vehicle wheel having a wheel body and a plurality of stud-receiving openings with each located to receive a stud projecting from a wheel hub of a vehicle, each stud-receiving opening having:
      1) a conically shaped section with an interior presented conically shaped side wall, and
      2) a cylindrically shaped section with an interiorly presented cylindrically shaped wall;
   b) a wheel insert for each said stud-receiving opening and being fitted into and retentively retained in the conically shaped section of the stud-receiving openings, each said wheel insert comprising:
      1) a conically shaped body adapted to substantially conform to the conically shaped section of the stud-receiving opening and having a portion which engages a portion of the conically shaped section of the stud-receiving opening,
      2) said conically shaped body further having:
         i) a conically shaped exterior wall facing the interiorly presented conically shaped wall of the stud-receiving opening, and
         ii) a conically shaped interior wall,
      3) an outer opening on said circularly shaped body distal to said vehicle wheel and an inner opening on said circularly shaped body proximate to said wheel and which openings are sized to receive a stud extending through the insert; and
   c) a lug nut threadedly secured to each stud projecting through a stud-receiving opening and the wheel insert therein, each said lug nut having an element which engages the interiorly presented surface of the conically shaped body of the insert and forces the conically shaped exterior surface of the wheel insert body into contact with the interiorly presented surface of the stud-receiving opening causing a deflection of the insert body to provide a Belleville spring-type action against the lug nut and thereby lock the lug nut on the stud.

16. The non-ferrous wheel arrangement of claim 15 wherein said lug nut further comprises a tool-receiving section and a tapered section extending downwardly from said tool-receiving section, said tapered section being conically shaped and having a surface size to extend into and conforming to the interior surface of said insert body.

17. The non-ferrous wheel arrangement of claim 16 wherein said locking action also results from an upper circular ring flange which is disposed on a seating surface of shoulder facing outwardly with respect to the wheel and surrounding the stud-receiving opening.

18. The non-ferrous wheel arrangement insert of claim 16 wherein a portion of the body of the insert is deflected so that the exterior surface of the insert bears against the interior surface of the frusto-conically shaped portion of the stud-receiving opening to cause a torsion ring effect.

19. The non-ferrous wheel arrangement of claim 18 wherein the deflection of the insert is caused by a lower portion of a tool-receiving section of the lug nut bearing against the insert.

20. An insert for use in stud-receiving openings of a non-ferrous vehicle wheel for aiding in the mounting of the vehicle wheel with mounting studs extending between the hub of a vehicle and a vehicle wheel, said insert comprising:
   a) a frusto-conically shaped body having an opened upper end facing outwardly from a vehicle wheel when in use and an opened lower end proximate to the vehicle wheel when in use and a tubular channel extending therethrough to receive the stud projecting from the hub of a vehicle, said body being stamped from a sheet metal having a hardness greater than and providing a bearing and seating surface which i$ harder and more durable and less susceptible to galling than aluminum or magnesium;
   b) said body of said insert having an exterior frusto-conically shaped wall which generally conforms to and engages a frusto-conically shaped portion of a wall of a stud-receiving opening in a vehicle wheel; and
   c) said frusto-conically shaped body of the insert having a wall thickness which is generally constant throughout the major portion of its overall surface area and which generally constant thickness is less than 0.125 inch.

21. The insert of claim 20 further comprises a circular ring flange at the upper opening and extending around the upper opening of the insert.

22. The insert of claim 20 further comprises a wall thickness in the major portion of its overall surface area of the insert ranging from about 0.020 to about 0.07 inch.

23. The insert of claim 20 further comprising a wall thickness in the major portion of its overall surface area of the insert of approximately 0.044 inch.

24. The insert of claim 20 wherein said insert is formed in a stamping operation and has a relatively thin wall thickness such that it is capable of deflecting slightly when inserted in a stud-receiving opening and has substantially less weight than a forged steel insert, the deflection of the body of the insert also aiding in locking the insert into the stud-receiving opening.

25. An improved means for permanently locking a circularly shaped non-skirted wheel insert in a stud-receiving opening of a non-ferrous metal vehicle wheel and where the stud-receiving opening is surrounded by a shoulder-forming wall in the vehicle wheel, said insert also having a body with a circularly shaped exterior surface and a circularly shaped interior surface and an upper end adapted to face outwardly with respect to a vehicle wheel and a lower end adapted to face inwardly toward a vehicle hub when in use, said insert body having a central bore extending therethrough with an upper opening at the upper end and a lower opening at the lower end in communication with the bore and where there is no skirt extending beyond said lower opening and lower end of the body which provides any substantial locking action for holding the insert in the stud-receiving opening; said improved means for permanently locking comprising an annular projecting ring at the upper opening, said ring having an outer annular end wall lying in a plane generally parallel to an axial centerline passing through said central bore and the upper and lower openings, said end wall being engagable with the wall surrounding the stud-receiving opening and said ring cooperating with the shoulder-forming wall in such manner that it provides the primary locking force for tightly retaining the insert in the stud-receiving opening.

26. The improved means for permanently locking the wheel insert of claim 25 further comprising an upper annular edge on the outer annular end wall of the annular projecting ring and said upper annular edge is sized to effectively bite into and become tightly engaged in the soft metal forming the wall of the stud-receiving opening by an interference effect.

27. The improved means for permanently locking the wheel insert of claim 25 further comprising a skirt which is swaged into the lower end of the insert and the insert is a steel insert.

28. The improved means for permanently locking the wheel insert of claim 25 comprising an inwardly projecting annular protrusion extending around the shoulder-forming wall and being integral with the metal forming the vehicle wheel and which is deflected into the stud-receiving opening and engages an upper portion of the annular projecting ring of the insert so that the insert is staked into the stud-receiving opening.

29. The improved means for permanently locking the wheel insert of claim 25 further comprising projecting portions on the annular end wall of the ring flange and which portions have edges which effectively bite into the metal of the vehicle wheel and thereby retentively hold the insert in the stud-receiving opening.

30. The improved means for permanently locking the wheel insert of claim 29 further comprising a plurality dimples on the annular wall of the projecting ring which engage the shoulder-forming wall and thereby retentively hold the insert in the stud-receiving opening.

31. The improved means for permanently locking the insert of claim 25 wherein said circularly shaped body is frusto-conical body which is used in conically shaped portion of a stud-receiving opening of the vehicle wheel.

32. The improved means for permanently locking the insert of claim 31 wherein said body section is sufficiently thin walled so that it will deflect under the force of a lug nut tightened thereagainst and aid in locking the insert in the stud-receiving opening.

33. An assembly comprised of at least a frusto-conically shaped insert and a lug nut for mounting a non-ferrous metal vehicle wheel onto a stud projecting outwardly from a wheel hub of the vehicle and through a stud-receiving opening of the wheel, said assembly comprising:

a) an insert having a conically shaped body with a conically shaped wall fitted within a frusto-conically shaped portion of the stud-receiving opening, said wall of said body having a frusto-conically shaped exterior surface with a portion thereof which engages and generally conforms to an interior surface of the frusto-conically shaped portion of the stud-receiving opening, said wall of said insert body also having a frusto-conically shaped interior surface, said insert also being formed with properties so that it can deflect with a spring-type action under a force applied thereto;

b) a lug nut having a tool-receiving section and a tapered section extending downwardly from said tool-receiving section, said tapered section being conically shaped and having a surface sized to extend into and conforming to an interior surface of said insert body;

c) said insert being formed of a metal which is harder than that of the non-ferrous wheel and operating to provide a torsion ring effect with a Belleville spring-type action when deflected, said insert also having an angle of taper different from the angle of taper of the frusto-conically shaped portion of the stud-receiving opening; and d) said lug nut a portion thereof which engages the interior surface of said insert body and causes a deflection of the insert to provide a Belleville spring-type action against the lug nut and thereby locks the lug nut on the stud.

34. The insert of claim 33 wherein the angle of taper of the insert is less than the angle of taper of the frusto-conically shaped portion of the stud-receiving opening with respect to an axial centerline passing through the insert and stud-receiving opening.

35. The insert of claim 33 wherein a portion of the body of the insert is deflected when a portion of the tool-receiving section of the lug nut bears against the insert so that the exterior surface of the insert bears against the interior surface of the frusto-conically shaped portion of the stud-receiving opening to cause a torsion ring effect.

36. A non-ferrous wheel arrangement for mounting a non-ferrous vehicle wheel to a wheel hub of a vehicle, said arrangement comprising:

a) a non-ferrous vehicle wheel having a wheel body and a plurality of stud-receiving openings with each located to receive a stud for mounting a vehicle wheel to a hub of a vehicle, each stud-receiving opening having:
1) a diametrically enlarged circularly shaped section with an interiorly presented circularly shaped side wall, and
2) a diametrically reduced cylindrically shaped stud accommodating section with an interiorly presented cylindrically shaped wall;

b) a wheel insert for each said stud-receiving opening and being fitted into and retentively retained in the circularly shaped section of the stud-receiving openings, each said wheel insert comprising:
1) a circularly shaped body adapted to substantially conform to the circularly shaped diametrically enlarged section of the stud-receiving opening and having a portion which engages a portion of the diametrically enlarged circularly shaped section of the stud-receiving opening,
2) said circularly shaped body further having:
i) a circularly shaped exterior surface facing the interiorly presented diametrically enlarged circularly shaped wall of the stud-receiving opening, and
ii) a circularly shaped interior seating surface,
3) an outer opening on said circularly shaped body distal to said vehicle wheel and an inner opening on said circularly shaped body proximate said wheel and which openings are sized to receive a stud extending through the insert; and c) a head associated with each stud projecting through a stud-receiving opening and the wheel insert therein, each said head having an element which engages the interiorly presented seating surface of the circularly shaped body of the insert and forces the circularly shaped exterior surface of the insert body into contact with the interiorly presented surface of the stud-receiving opening, said insert body and also being formed of a selected steel and with thickness so that it has properties enabling it to deflect slightly under pressure and when subjected to the force of a head bearing against the insert while being tightened, causes a deflection of the insert body to provide a Belleville spring-type action against the head, the insert also being sufficiently resilient to provide a torsion ring effect such that it reacts against the action of the head bearing against the insert creating an opposing force against the body under the Belleville spring-type action and thereby lock the head in a locked position.

37. The non-ferrous wheel arrangement of claim 36 wherein said head is a lug nut and said lug nut further has a tool-receiving section and a tapered section extending downwardly from said tool-receiving section, said tapered section being conically shaped and having a surface sized to extend into and conforming to the interior surface of said insert body.

38. A steel insert for use in stud-receiving openings of non-ferrous metal vehicle wheels, and which openings each having a conically shaped portion at the outer end thereof and a diametrically enlarged shoulder-forming wall surrounding the opening, said insert comprising:

a) a continuous frusto-conical body section adapted for fitted disposition in the conically-shaped portion of a stud-receiving opening of a non-ferrous vehicle wheel;

b) said body section terminating in a circular upper opening distal to the vehicle wheel and a lower circular opening proximate to the wheel to allow a vehicle stud to extend therethrough;

c) said upper opening being sized to accommodate a lug nut to be secured to a stud extending through the opening and allowing the lug nut to bear against an interior surface of said body section;

d) a circular ring flange at the upper opening extending around the upper opening and radially outwardly from an exterior surface of said body section to engage a portion of the stud-receiving opening and aid in retentively holding the insert in the stud-receiving opening; and e) said insert being formed in a stamping operation and having a relatively thin wall thickness such that it is capable of deflecting slightly when inserted in a stud-receiving opening and has substantially less weight than a forged steel insert, the deflection of the body of the insert also aiding in locking the insert into the stud-receiving opening.

39. The steel insert of claim 38 wherein said ring flange and said body each have a relatively constant thickness throughout.

40. A steel insert for use in stud-receiving openings of non-ferrous metal vehicle wheels and which openings each have a conically shaped portion at the outer end thereof and a diametrically enlarged shoulder-forming wall surrounding the opening, said insert comprising:

a) a continuous frusto-conical body section adapted for fitted disposition in the conically-shaped portion of a stud-receiving opening of a non-ferrous vehicle wheel;

b) said body section terminating in a circular upper opening distal to the vehicle wheel and a lower circular opening proximate to the wheel to allow a vehicle stud to extend therethrough;

c) said upper opening being sized to accommodate a lug nut to be secured to a stud extending through the opening and allowing the lug nut to bear against an interior surface of said body section;

d) a circular ring flange at the upper opening extending around the upper opening and radially outwardly from an exterior surface of said body section to engage a portion of the shoulder-forming wall surrounding the stud-receiving opening and aid in retentively holding the insert in the stud-receiving opening; and e) said insert body being formed of a selected steel and with sufficient thickness so that it has properties enabling it to deflect slightly under pressure and when subjected to the force of a lug nut bearing against the insert while being tightened on a wheel stud causes a deflection of the body, the insert also being sufficiently resilient to provide a torsion ring effect such that it reacts against the action of a lug nut bearing against the insert creating an opposing force against the lug nut under the Belleville spring action to thereby lock the lug nut on the stud.

* * * * *